United States Patent [19]

Witman et al.

[11] Patent Number: 4,506,047

[45] Date of Patent: Mar. 19, 1985

[54] POLYCARBONATE COMPOSITIONS HAVING IMPROVED RIGIDITY

[75] Inventors: Mark W. Witman, Krefeld, Fed. Rep. of Germany; Gerard E. Reinert, McMurray, Pa.

[73] Assignee: Mobay Chemical Corporation, Pittsburgh, Pa.

[21] Appl. No.: 501,594

[22] Filed: Jun. 6, 1983

[51] Int. Cl.$^3$ .......................... C08K 5/34; C08L 69/00
[52] U.S. Cl. ........................ 524/89; 524/94; 524/611
[58] Field of Search ........................... 524/89, 94, 611

[56] References Cited

U.S. PATENT DOCUMENTS

| | | | |
|---|---|---|---|
| 3,274,144 | 9/1966 | Keskkula et al. | 260/32.6 |
| 3,386,795 | 6/1968 | Caldwell et al. | 524/89 |
| 3,579,363 | 5/1971 | Sears | 524/94 |
| 3,579,364 | 5/1971 | Sears | 524/94 |
| 3,734,926 | 5/1973 | Dexter | 524/94 |
| 3,746,721 | 7/1973 | Stephen | 524/94 |
| 3,821,161 | 6/1974 | Stephen | 524/94 |
| 3,821,162 | 6/1974 | Dexter | 524/94 |
| 3,873,567 | 3/1975 | Cyba | 260/326 C |
| 3,883,476 | 5/1975 | Dexter | 524/94 |
| 4,087,441 | 5/1978 | Lee | 260/326 N |
| 4,119,603 | 10/1978 | Holub | 524/94 |
| 4,393,190 | 7/1983 | Tyrell | 524/611 |

FOREIGN PATENT DOCUMENTS

| | | | |
|---|---|---|---|
| 7016058 | 1/1982 | Japan | 524/94 |
| 7149352 | 9/1982 | Japan | 524/89 |
| 7190039 | 11/1982 | Japan | 524/611 |

Primary Examiner—C. Warren Ivy
Attorney, Agent, or Firm—Gene Harsh; Lawrence S. Pope; Aron Preis

[57] ABSTRACT

It is an object of the invention to provide a polycarbonate composition having improved mechanical properties and a process for the preparation of said composition. These objects are achieved in accordance with the present invention which teaches a blend of a polycarbonate resin and an additive amount of an aromatic bis-imide compound. The composition comprising said blend retains a surprising degree of ductility as measured by tensile elongation and yield strength and exhibits an improvement in both tensile strength and flexural modulus.

4 Claims, No Drawings

POLYCARBONATE COMPOSITIONS HAVING IMPROVED RIGIDITY

FIELD OF THE INVENTION

This invention relates to polycarbonates and more particularly to polycarbonate compositions containing aromatic bis-imide compounds.

SUMMARY OF THE INVENTION

It is an object of the invention to provide a polycarbonate composition having improved mechanical properties and a process for the preparation of said composition. These objects are achieved in accordance with the present inveniton which teaches a blend of a polycarbonate resin and an additive amount of an aromatic of an aromatic bis-imide compound. The composition comprising said blend retains a surprising degree of ductility as measured by tensile elongation and yield strength and exhibits an improvement in both tensile strength and flexural modulus.

BACKGROUND OF THE INVENTION

Polycarbonates derived from reactions involving organic dihydroxy compounds and carbonic acid derivatives have found extensive commercial application because of their excellent mechanical and physical properties. These thermoplastic polymers are particularly suited for the manufacture of molded articles where impact strength, rigidity, toughness, thermal and dimensional stability as well as excellent electrical properties are required.

Various additives aimed at modifying selected properties of polycarbonate resins have been reported and are known in the art. In particular, as related to the present invention, the art is noted to include U.S. Pat. No. 3,274,144 wherein taught are polycarbonate compositions comprising aliphatic amides characterized by their reduced melt viscosity, and U.S. Pat. No. 4,119,603 which is directed to plasticization of polycarbonate compositions by adding thereto certain nitrogen containing compounds which include certain monoimides.

The art is further noted to include U.S. Pat. No. 4,087,441 wherein taught is a preparation method of certain bisimides and U.S. Pat. No. 3,873,567 which discloses the efficacy of a halogenated bis-imide compound as a flame retarding agent in polycarbonates.

In accordance with the present invention, a polycarbonate composition is provided characterized by its improved mechanical properties.

DETAILED DESCRIPTION OF THE INVENTION

When used herein, the term "polycarbonate resin" means the neat resin without additives, and the term "polycarbonate" means the polycarbonate resin with additives therein.

The polycarbonate resins of the invention may be prepared by conventional methods of preparation for polycarbonate resins and may have a weight average molecular weight between 10,000 and 200,000 and preferably have a melt flow rate of about 1 to 24 gm/10 min., most preferably about 2–6 gm/10 min., at 300° C. according to ASTM D-1238. These polycarbonate resins may be prepared, for example, by the known diphasic interface process from phosgene and dihydroxy compounds by polycondensation (see the monograph H. Schnell, *Chemistry and Physics of Polycarbonates*, Interscience Publishers, New York, 1964, incorporated herein by reference).

In the present context, dihydroxy compounds suitable for the preparation of the polycarbonates of the invention conform to the structural formula (1) or (2)

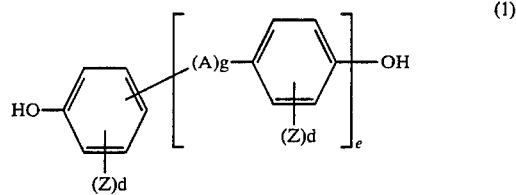

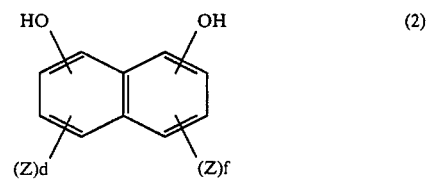

wherein
A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, an S, —SO— or —$SO_2$— radical, a radical of the general formula

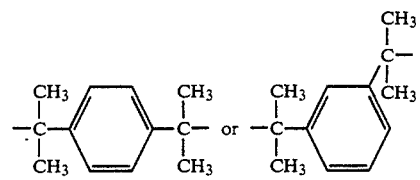

g denotes the number 0 or 1;
e denotes the number 0 or 1;
Z denotes F, Cl, Br or $C_1$–$C_2$ alkyl and if several Z radicals are substituents in one aryl radical, they may be identical or different;
d denotes 0 or an integer of from 1 to 4; and
f denotes 0 or an integer of from 1 to 3.

Among the useful dihydroxy compounds in the practice of the invention are hydroquinone, resorcinol, bis-(hydroxyphenyl)-alkanes, bis-(hydroxyphenyl)-cycloalkanes, bis-(hydroxyphenyl)-ethers, bis-(hydroxyphenyl)-ketones, bis-(hydroxyphenyl)-sulfoxides, bis-(hydroxyphenyl)-sulfones and α,α-bis-(hydroxyphenyl)-diisopropylbenzenes. These and further suitable aromatic dihydroxy compounds are described, for example, in U.S. Pat. Nos. 3,028,365; 2,999,835; 3,148,172; 3,271,368; 2,991,273; 3,271,367; 3,280,078; 3,014,891 and 2,999,846 (all incorporated herein by reference), in German Offenlegungsschriften (German Published Specifications) Nos. 1,570,703; 2,063,050; 2,063,052; 2,211,956 and 2,211,957, in French Patent Specification No. 1,561,418 and in the monograph, H. Schnell, *Chemistry and Physics of Polycarbonates*, Interscience Publishers, New York, 1964. Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropylbenzene, 2,2-bis-(3-chloro-4-hydroxyphenyl)-propane, hydroxybenzophenone and 4,4'-sulfonyl diphenol.

The most preferred bisphenol is 2,2-bis-(4-hydroxyphenyl)-propane (bisphenol A).

The polycarbonates of the invention may entail in their structure, units derived from one or more of the suitable bisphenols.

The preparation of polycarbonate resins may be carried out in accordance with any of the processes known in the art, for example, by the interfacial polycondensation process, polycondensation in a homogeneous phase or by transesterification.

The suitable processes and the associated reactants, catalysts, solvents and conditions are known in the art and have been described, inter alia, in German Pat. Nos. 1,046,311 and 962,274 and in U.S. Pat. Nos. 3,248,414; 3,153,008; 3,215,668; 3,187,065; 3,028,365; 2,999,846; 2,999,835; 2,964,974; 2,970,137; 3,912,638 and 2,991,273.

In the preparation of the polycarbonate resins of the invention, monofunctional reactants such as monophenols may be used in order to limit their respective molecular weights. Also, branching agents may be employed. Branching may be obtained by the incorporation of small amounts, preferably of between about 0.05 and 2.0 mol percent (relative to diphenols employed), of trifunctional or more than trifunctional compounds, especially compounds having three or more phenolic hydroxyl groups. Polycarbonates of this type are described, for example, in German Offenlegungsschriften (German Published Specifications) Nos. 1,570,533; 1,595,762; 2,116,974 and 2,113,347; British Specification No. 1,079,821 and U.S. Pat. No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane, 2,4,6-trimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxy-benzoic acid, trimesic acid, cyanuric chloride and 3,3-bis-(4-hydroxyphenyl)-2-oxo-2,3-dihydroindole.

Among the resins suitable in the practice of the invention are included phenolphthalein based polycarbonate, copolycarbonates and terpolycarbonates such as are described in U.S. Pat. Nos. 3,036,036 and 4,210,741, both incorporated by reference herein.

The modifying additive suitable in the present compositions is halogen-free aromatic bis-imide which is characterized in that its melting temperature is at or below the melting range of the polycarbonate resin wherein it is blended, preferably the melting temperature of said aromatic bis-imide is less than 260° C., especially less than 240° C.

Among the aromatic bis-imide compounds suitable in the practice of the invention are those conforming structurally to

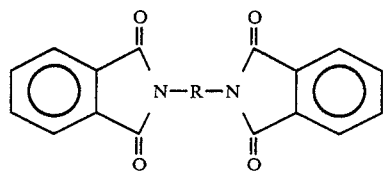

wherein
R is selected from the group consisting of $C_1$–$C_{20}$ alkylene, arylene, cycloalkylene, alkarylene, and aralkylene radicals, preferably —$CH_2CH_2$—, $(CH_2)_6$, and $(CH_2)_{12}$ and

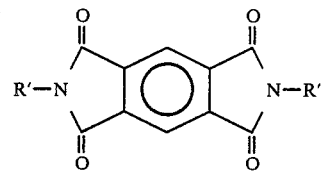

wherein
R' is selected from the group consisting of a hydrogen atom, a $C_1$–$C_{20}$ alkyl, aryl, cycloalkyl, alkaryl, and aralkyl radicals, preferably a $(CH_2)_nCH_3$ radical where n is from 1 to 12 especially —$(CH_2)_{11}CH_3$. Also preferable is N,N-bisalkylene-1,2,4,5-benzene tetracarboximide.

In the practice of the invention, thermoplastic molding compositions comprising a blend of an aromatic polycarbonate resin and an additive amount of the aromatic bis-amide compound are prepared, characterized by its improved level of properties. The additive amount is that which is sufficient to impart said improved properties, preferably 1.0 to 10.0 phr, relative to the weight of the polycarbonate resin.

The polycarbonates of the present invention may also contain other conventional resin additives such as pigments, dyes, UV stabilizers, thermal stabilizers, mold release agents and fillers.

Any additives, including glass fibers, may be blended with the polycarbonate resin in known mixing devices such as kneaders, single-screw extruders, twin-screw extruders, mills and the like.

The invention will be further illustrated but is not intended to be limited by the following Examples.

In the Examples, melt flow index is measured in accordance with ASTM D-1238; the Izod impact strength is determined in accordance with ASTM D-256; tensile properties and flexural properties in accordance with ASTM D-638 and D-790, respectively.

The invention is further illustrated, but is not intended to be limited by the following examples in which all parts and percentages are by weight unless otherwise specified.

EXAMPLES

EXAMPLE 1

The preparation of the N,N-ethylene bisphthalimide used in the composition of Table 1 followed a procedure whereby 108 gm (1.8 mol) of ethylene diamine was slowly added to a solution consisting of 540 gm (3.65 mols) of phthalic anhydride in 8000 ml of DMF (distilled). After the addition, the mixture was refluxed at 150° C. and the precipitate filtered and washed.

The compositions described below were prepared on a 1½" single-screw W&H extruder using a 1.75:1 compression screw. The polycarbonate resin used was a bisphenol A based homopolycarbonate having a melt flow index of about 6 to 11.9 gm/10 min.

TABLE 1

|  | Control | Added N,N—ethylene bisphthalimide (phr) | | |
|---|---|---|---|---|
|  |  | 1.0 | 3.0 | 5.0 |
| Melt flow index, gm/10 min. | 6.9 | 8.0 | 9.1 | 12.5 |
| Critical thickness, mils | 175 | 155 | 115 | <90 |
| Impact strength Notched Izod, ft. lb./in. | | | | |
| ⅛" | 17.35 | 17.72 | 2.56 | 1.60 |
| ¼" | 2.66 | 2.10 | 1.68 | 1.35 |
| Tensile yield, psi × $10^{-3}$ | 9.01 | 9.40 | 9.83 | 10.40 |
| Tensile failure, psi × $10^{-3}$ | 9.60 | 9.40 | 9.80 | 8.19 |
| Elongation, % | 105 | 105 | 105 | 85–110 |
| Flexural modulus psi × $10^{-5}$ | 3.32 | 3.56 | 3.73 | 3.98 |
| Flexural strength psi × $10^{-3}$ | 13.92 | 14.66 | 15.29 | 15.50 |

EXAMPLE 2

The preparation of N,N-hexamethylene bisphthalimide used in the preparation of the composition below followed the procedure described above; 11.6 gms (0.1 mol) of hexamethylene diamine in 25 ml of DMF were added dropwise to a solution consisting of 30.0 gm (0.2 mols) of phthalic anhydride in 500 ml of DMF (distilled).

The preparation of the compositions was carried out in accordance with the procedure described above.

TABLE 2

|  | Control | Added N,N—hexamethylene bisphthalimide (phr) | | | |
|---|---|---|---|---|---|
|  |  | 1.0 | 3.0 | 5.0 | 10.0 |
| Melt flow rate, gm/10 min. | 6.9 | 7.3 | 9.6 | 2.9 | — |
| Critical thickness, mils | 175 | 145 | 115 | <90 | <90 |
| Impact strength, Notched Izod ft. lb./in. | | | | | |
| ⅛" | 17.35 | 17.43 | 2.75 | 1.78 | 0.84 |
| ¼" | 2.66 | 2.17 | 1.60 | 1.34 | 0.78 |
| Tensile yield, psi × $10^{-3}$ | 9.01 | 9.40 | 10.01 | 10.40 | 10.78 |
| Tensile failure, psi × $10^{-3}$ | 9.60 | 9.40 | 10.01 | 10.40 | — |
| Elongation, % | 105 | 95 | 100 | 100 | 105–110 |
| Flexural modulus psi × $10^{-5}$ | 3.32 | 3.51 | 3.74 | 3.89 | 4.20 |
| Flexural strength, psi × $10^{-3}$ | 13.92 | 14.82 | 15.65 | 16.32 | 17.95 |

EXAMPLE 3

In preparing the N,N-dodecyl bisphthalimide used in the composition of Table 3, the procedure entailed steps known in the art.

The compositions described below were prepared in accordance with the procedure described above.

TABLE 3

|  | Control | Added N,N—dodecyl bisphthalimide 5.0 phr |
|---|---|---|
| Critical thickness, mils | 185 | <90 |
| Impact strength, | | |
| Notched Izod ft. lb./in. | | |
| ⅛" | 16.81 | 1.17 |
| ¼" | 2.77 | 1.05 |
| Tensile yield, psi × $10^{-3}$ | 8.19 | 10.30 |
| Tensile failure, psi × $10^{-3}$ | — | — |
| Elongation, % | 20–112 | 40–100 |
| Flexural modulus, psi × $10^{-5}$ | 3.13 | 3.69 |
| Flexural strength, psi × $10^{-3}$ | 13.99 | 16.64 |

EXAMPLE 4

The preparation of N,N-bisdodecyl-1,2,4,5-benzene tetracarboximide was carried out as follows:

To a solution comprising 5000 ml of DMF and 741.6 gms of dodecylamine was slowly added a solution of 436.2 gms of 1,2,4,5-benzetetracarboxylic anhydride in 1500 ml of DMF. After all the anhydride solution was added during which time the reaction was held at 30°–40° C. by cooling and an additional period of 2 hours at 30° C., the temperature was raised and the reaction refluxed at 150° C. About half of the amount of solvent was stripped off and the reaction vessel cooled to room temperature. The precipitate was filtered under vacuum and washed with DMF and then with methanol.

TABLE 4

|  | Control | Added N,N—bisdodecyl-1,2,4,5-benzene tetracarboximide, phr | | | |
|---|---|---|---|---|---|
|  |  | 1.0 | 3.0 | 5.0 | 10.0 |
| Critical thickness, mils | 185 | 166 | 115 | 90 | <90 |
| Impact strength, Notched Izod ft. lb./in. | | | | | |
| ⅛" | 16.81 | 17.09 | 2.36 | 1.92 | 0.90 |
| ¼" | 2.77 | 1.79 | 1.27 | 1.04 | 0.87 |
| Tensile yield, psi × $10^{-3}$ | 8.19 | 9.28 | 9.79 | 10.27 | 10.59 |
| Elongation, % | 20–112 | 95–100 | 97–110 | 107–110 | 100–105 |
| Flexural modulus, psi × $10^{-5}$ | 3.13 | 3.28 | 3.63 | 3.67 | 3.77 |
| Flexural strength, psi × $10^{-3}$ | 13.99 | 14.14 | 15.40 | 15.78 | 17.42 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising an aromatic polycarbonate resin and about 1.0 to about 10.0%, relative to the weight of said polycarbonate resin, of at least one halogen-free bisimide compound selected from the group consisting of

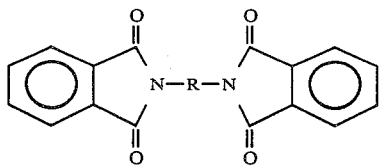

wherein R denotes a divalent aliphatic, aromatic, cycloaliphatic or mixed aliphatic-aromatic radical having 1 to 20 carbon atoms and

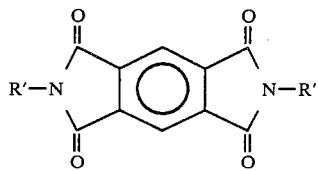

wherein R' denotes a $C_1$–$C_{20}$ alkyl, and cycloalkyl radical, said compound further characterized in that its melting temperature is at or below the melting temperature range of said polycarbonate resin.

2. The composition of claim 1 wherein said aromatic bis-imide compound is characterized in that its melting temperature is at most 260° C.

3. The composition of claim 1 wherein said R is selected from the group consisting of —$CH_2CH_2$—, —$(CH_2)_6$—, and —$(CH_2)_{12}$—.

4. The composition of claim 1 wherein said R' is a —$(CH_2)_n CH_3$ radical wherein n denotes an integer from 1 to 12.

* * * * *